Oct. 7, 1969 G. KIPER Re. 26,681

LIGHT CONTROLLED SHUTTER

Original Filed Sept. 29, 1960 3 Sheets-Sheet 1

INVENTOR.
GERD KIPER
BY
Michael S. Striker
Attorney

LIGHT CONTROLLED SHUTTER

Original Filed Sept. 29, 1960 3 Sheets-Sheet 2

INVENTOR.
GERD KIPER

BY
Michael S. Striker
Attorney

LIGHT CONTROLLED SHUTTER

Original Filed Sept. 29, 1960 3 Sheets-Sheet 3

INVENTOR.
GERD KIPER
BY
Michael S. Striker
Attorney

United States Patent Office

Re. 26,681
Reissued Oct. 7, 1969

26,681
LIGHT CONTROLLED SHUTTER

Gerd Kiper, Unterhaching, near Munich, Germany, assignor to Agfa Aktiengesellschaft, Leverkusen-Bayerwerk, Germany Original No. 3,165,989, dated Jan. 19, 1965, Ser. No. 59,375, Sept. 29, 1960. Application for reissue Jan. 31, 1967, Ser. No. 617,435
Claims priority, application Germany, Oct. 2, 1959, A 32,974; Oct. 31, 1959, A 33,161
Int. Cl. G01j *1/44*; G03d *9/08*
U.S. Cl. 95—10 27 Claims

Matter enclosed in heavy brackets [ ] appears in the original patent but forms no part of this reissue specification; matter printed in italics indicates the additions made by reissue.

*ABSTRACT OF THE DISCLOSURE*

*A shutter wherein the blades are connected to a leading and a trailing shutter ring. A pawl which holds the trailing ring subsequent to release of the leading ring and resulting opening of the shutter is disengaged from the trailing ring by a light-sensitive relay system to effect closing of the shutter with a delay which is a function of scene brightness.*

The present invention relates to cameras.

More particularly, the present invention relates to cameras which have devices for automatically controlling the exposure of film in a camera. Such devices at the present time are quite complex and expensive and do not always operate satisfactorily. Furthermore, with automatic arrangements of this type it very often happens that an exposure will be made when the lighting conditions are not suitable for an exposure, so that either under-exposure or over-exposure results.

One of the objects of the present invention is to provide a camera with an automatic exposure control which is extremely simple and inexpensive and which at the same time is quite compact occupying an exceedingly small amount of space and having no undesirable influence on the weight of the camera.

Another object of the present invention is to provide in a camera of the above type a means which will automatically determine the exposure time of the shutter.

A further object of the present invention is to provide a camera with an automatic exposure time control which can be conveniently and easily influenced to take into account such considerations as the size of the exposure aperture and the speed of the film which is in the camera.

It is also an object of the present invention to provide an automatic exposure time control which can be conveniently used with all types of shutters.

An additional object of the present invention is to provide a camera of the above type with a means which will automatically prevent an exposure from being made when the lighting conditions are such that a proper exposure cannot be obtained.

Among the objects of the present invention is also the provision of an arrangement which will automatically prevent over-exposure, under-exposure, and which at the same time can be easily adapted to take care of the over-exposure alone or under-exposure alone.

It is another object of the present invention to provide an exceedingly simple arrangement for combining together on the one hand a structure for automatically determining the time of exposure and a structure for automatically preventing exposure when the available light is not suitable for exposure.

It is also an object of the present invention to provide an arrangement where a single control structure effects both control of the time of exposure as well as prevention of exposure when the available light will not provide a proper exposure.

The object of the present invention also includes the provision of an exceedingly simple and compact assembly for preventing exposures when lighting conditions are not suitable and capable of being combined with any type of exposure time determining structure.

With the above objects in view the invention includes in a camera, a shutter means having open and closed positions for respectively making and preventing an exposure and a light-sensitive relay means which cooperates with the shutter means for determining the length of time that the latter remains in its open position. The object of the present invention also includes a light-sensitive relay means cooperating with a shutter means to prevent actuation thereof to make an exposure when the available light will not provide a proper exposure, and also in accordance with the present invention, these light-sensitive relay means can be combined together into a compact assembly operating from a single circuit with a single source of current or the light-sensitive relay means for preventing an exposure when the available light will not provide a proper exposure may be combined with other types of exposure time determining means differing from a light-sensitive relay type of construction.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
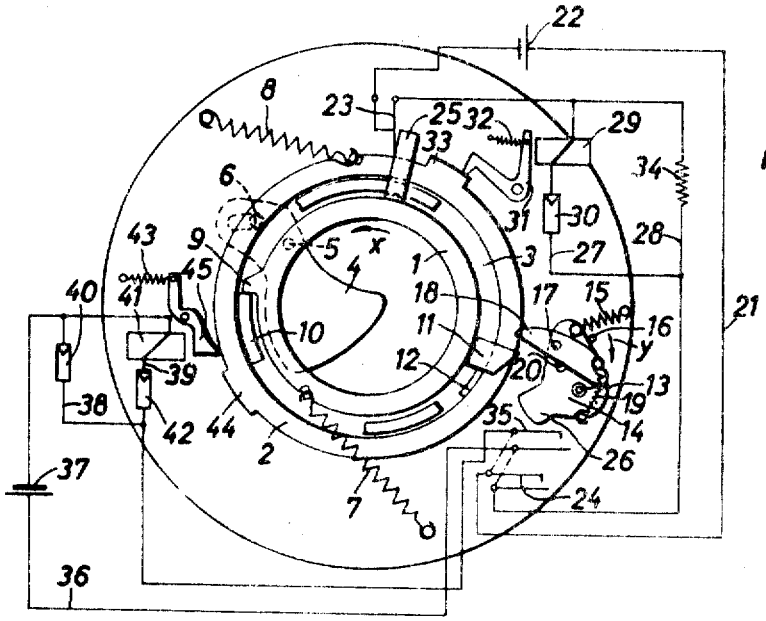
FIG. 1 illustrates one embodiment of a camera which has both a means for automatically determining exposure time and a means for automatically preventing an exposure when the available light will not provide a proper exposure.
Figure 2:
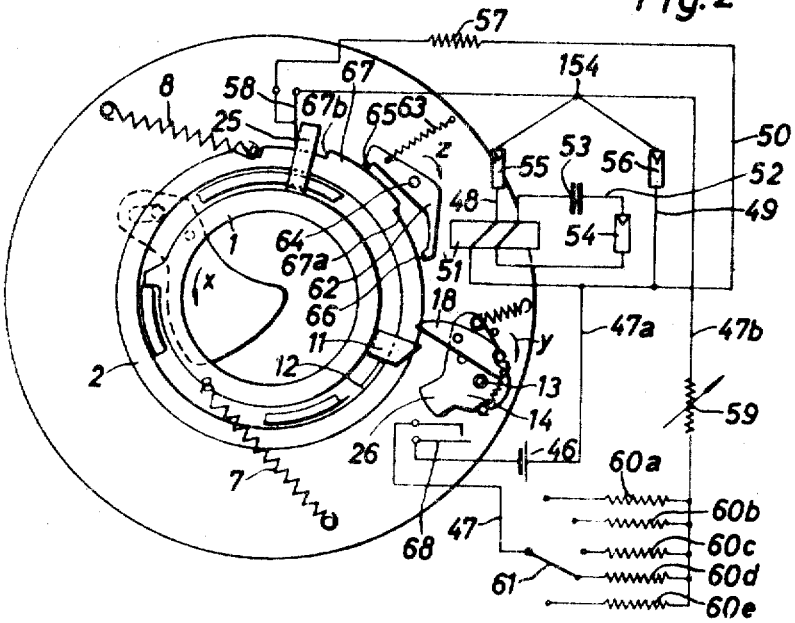
FIG. 2 shows another embodiment of the invention where the electrical circuits for the exposure time determining and exposure preventing structures are combined into a single circuit.
Figure 3:
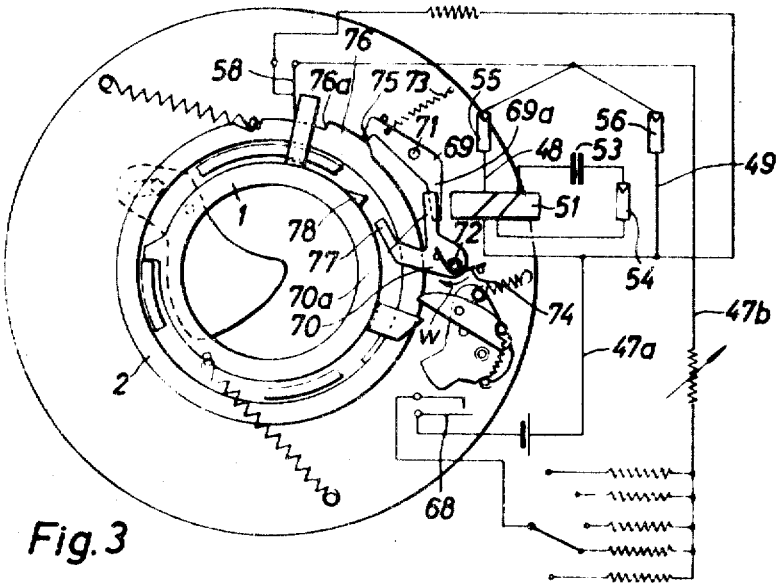
FIG. 3 shows a variation of the structure of FIG. 2 according to which a one-piece pawl of FIG. 2 is shown in FIG. 3 in the form of a pair of pawls.
Figure 4:
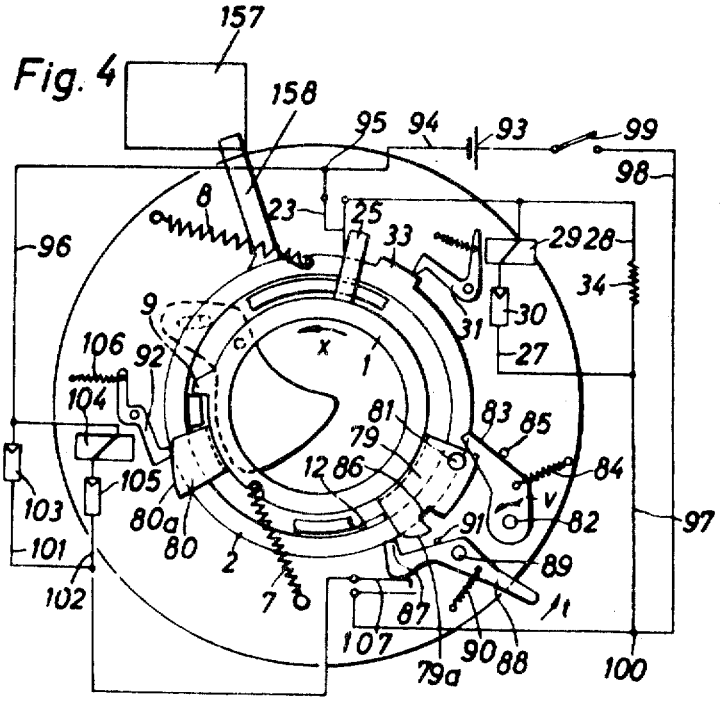
Figure 5:
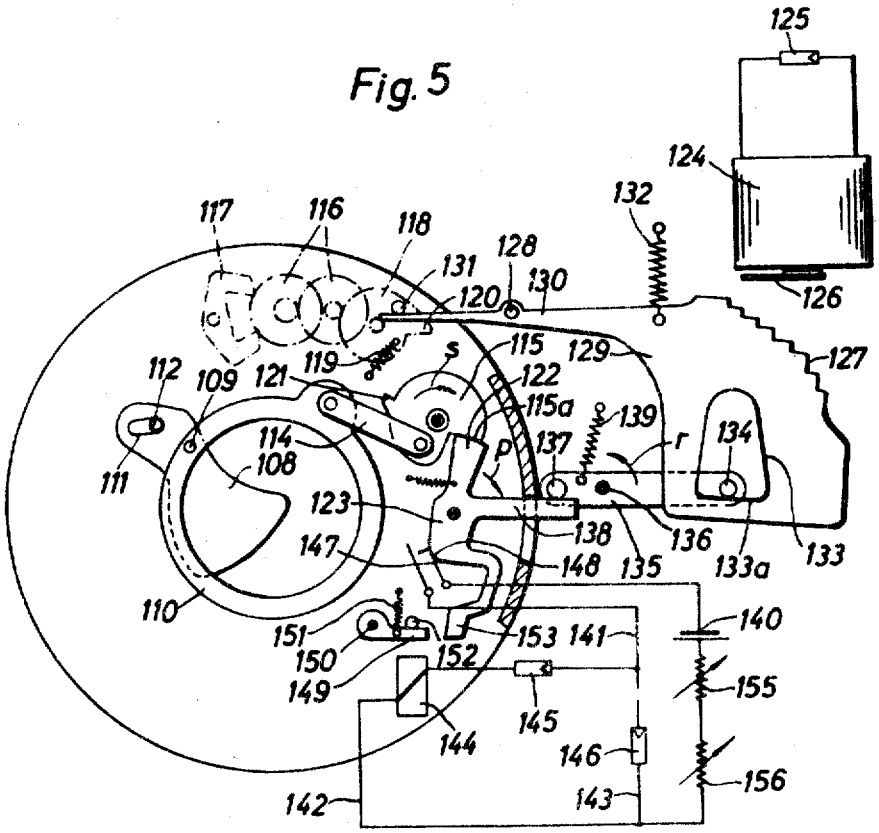

FIG. 4 shows another embodiment of a structure according to the present invention, the embodiment of FIG. 4 operating, when lighting conditions are suitable for a proper exposure, to prevent release of the shutter after it is cocked, while the embodiments of FIGS. 1–3 prevent cocking of the shutter when the lighting conditions will not provide a proper exposure; and FIG. 5 shows an exposure preventing means of the present invention in cooperation with a different type of structure for determining the exposure time and in cooperation with a shutter construction different from that of FIGS. 1–4.

Referring now to FIG. 1 it will be seen that the shutter illustrated therein includes an inner rotary shutter ring 1 which forms the leading ring of the shutter, as will be apparent from the description below, and the illustrated shutter includes an outer trailing rotary ring 2, these rings having a common axis coinciding with the optical axis. A stationary ring 3 which is supported by a transverse wall of the objective assembly is located between and supports the shutter ring 1 and 2 for rotary movement about the optical axis. The shutter includes a plurality of blades 4, only one of which is illustrated for the sake of clarity, and the leading shutter ring 1 carries a plurality of pivot pins 5 on which the blades 4 are respectively pivoted. These blades 4 extend through suitable slots formed in the ring 3 and have beyond the latter their own slots which respectively receive the pins 6 which are fixed to the trailing ring 2. Thus, when the shutter rings 1 and 2 turn one with respect to the other the shutter will open or close, as is well known. A spring means is provided for yieldably maintaining the shutter means 1, 2 in its rest position, and this spring means takes the form of a spring 7 connected to the leading shutter ring 1 for urging the latter in the direction of the arrow x shown in FIG. 1, while a spring 8 is connected with the trailing ring 2 for turning the latter also in the direction of the arrow x of FIG. 1. The inner ring 1 carries a projection 9 which engages a stationary projection 10 carried by the stationary ring 3, so that the spring 7 holds the projection 9 against the stop 10, and in this way the angular position of the leading ring 1 in the rest position of the shutter means is determined. The leading ring 1 also carries a lug 11 which extends radially beyond the ring 1 across the ring 3 and into overlapping relation with respect to the ring 2, and the ring 2 carries an axially extending lug 12 which is urged by the spring 8 against the lug 11 which cannot turn in a counterclockwise direction, as viewed in FIG. 1, beyond the position shown in FIG. 1, because of cooperation between the elements 9 and 10, so that these latter elements through the elements 11 and 12 also determine the angular position of the trailing ring 2 when the shutter means is in its position of rest. As is apparent from FIG. 1, in this rest position of the shutter means the angular positions of the rings 1 and 2 with respect to each other is such that the blades 4 overlap each other and extend across the interior of the ring 1 so as to place the shutter in its closed position preventing an exposure from being made.

In order to cock or tension the shutter of FIG. 1, a shaft 13 is supported in any suitable bearing for rotary movement and is connected to any suitable unillustrated handle or the like accessible to the operator so that the operator may turn the shaft 13 in a counterclockwise direction, as viewed in FIG. 1, about its axis, for the purpose of cocking and also releasing the shutter, as will be apparent from the description below. The shaft 13 fixedly carries a plate 14, and a spring 15 is operatively connected with the plate 14 for urging the latter together with the shaft 13 in a clockwise direction, as indicated by the arrow y on FIG. 1, the right edge of the plate 14, as viewed in FIG. 1, engaging a stationary stop pin 16 carried by the transverse wall of the shutter housing, so that in this way the rest position of the plate 14 and the shaft 13 is determined. This plate 14 furthermore fixedly carries a pivot pin 17 on which a pawl 18 is pivotally supported, and a spring 19 is connected at one to a lug of the plate 14 and at its opposite end to a lug of pawl 18 to urge the latter in a clockwise direction about the pivot 17 into engagement with a stop pin 20 which is fixedly carried by the plate 14. The arrangement of the pawl 18 is such that when the operator turns the shaft 13 in a direction opposite to the arrow y of FIG. 1, the pawl 18 will engage the lug 11 and turn the latter together with the ring 1 in a clockwise direction, and of course the lug 11 will move the lug 12 in advance of the lug 11 so that the trailing ring 2 turns together with the leading ring 1 and inasmuch as there is no relative movement between the rings 1 and 2 the blades 4 are not actuated and maintain the shutter means in its closed position during cocking of the shutter means. The operator continues to turn the shaft 13 and the plate 14 until the pawl 18 rides off the tip of the lug 11, and at this instant the ring 1 is released to the force of the tensioned spring 7 which immediately acts to turn the leading shutter ring 1 in the direction of the arrow x in advance of the ring 2. As is apparent from FIG. 1, the ring 2 is provided with an outer projection 33, and a pawl 31 is urged by the spring 32 in a counterclockwise direction, as viewed in FIG. 1. Just before the pawl 18 rides off the lug 11, the tooth of the pawl 31 snaps behind the left end of the projection 33, as viewed in FIG. 1, so that when the pawl 18 rides off the lug 11 the spring 7 will turn the leading shutter ring 1 but the spring 8 will be unable to turn the trailing shutter ring 2 since the latter will be retained by cooperation of the pawl 31 with the projection 33. In this way the ring 1 turns with respect to the ring 2 until the projection 9 engages the stop 10, and thus the shutter has been placed in its open position.

In order to control the exposure time, an electrical circuit 21 is provided, and this electrical circuit includes in addition to the source 22 of current a control switch 23 and an operating switch 24. The control switch 23 is engaged by a lug 25 projecting radially from the leading ring 1 across the stationary ring 3 and the trailing ring 2, as shown in FIG. 1, and when the ring 1 is in the angular position shown in FIG. 1 where the projection 9 engages the stop 10, the lug 25 engages the operating switch 23 to maintain the latter in a closed position. During cocking of the shutter when the ring 1 turns in a clockwise direction, as viewed in FIG. 1, the lug 25 moves away from the switch 23 so that the latter opens under the action of any suitable spring or the like, for example, and this switch 23 is again closed when the leading ring 1 turn to open the shutter in the manner described above. The lug 25 closes the switch 23 approximately when the ring 1 reaches its end position shown in FIG. 1. The operating switch 24 is closed by a camming projection 26 of the plate 14, and the angular position of this projection 26 is such that the operating switch 24 is closed by the projection 26 in the time interval between opening of the switch 23 during cocking of the shutter and release of the leading ring 1 by riding of the pawl 18 off the lug 11, and the projection 26 maintains the switch 24 closed during the exposure of the film, which is to say during the time that the shutter remains in its open position.

The circuit 21 includes between the switches 23 and 24 and the course of current 22 a pair of parallel-connected branches 27, 28, and in the branch 27 is a relay 29 as well as a light-sensitive resistor 30 connected in series with the relay 29 in the branch 27. The relay 29 includes an armature formed by the upper free end of the pawl 31, and thus when the coil of the relay 29 is energized it will attract the armature and turn the pawl 31 in opposition to the spring 32 in a clockwise direction, as viewed in FIG. 1 so as to move the pawl 31 away from the projection 33 and thus release the trailing shutter ring 2 to the spring 8. The branch 28 of the circuit is provided with a constant resistance 34.

As is apparent from the above description, when the lug 25 closes the switch 23 upon return of the leading ring 1 to the position shown in FIG. 1 while the trailing ring 2 is prevented from returning by cooperation of the pawl 31 and the projection 33, the switch 24 will have already been closed so that the circuit 21 is closed at the moment when the lug 25 closes the switch 23. Thus, current will now flow through the circuit and the flow of current will energize the relay 29 so as to turn the pawl 31 in opposition to the spring 32 away from the projection 33 and release the trailing ring 2 for return to the position shown in FIG. 1 so as to close the shutter. The moment when the relay 29 will be energized to release the trailing ring 2 depends upon the amount of current which flows through the branch 27 of the circuit, and thus in this way the exposure time is controlled. This amount of current is determined by a number of factors such as the relationship between the resistance of the resistor 34 and the resistance of the relay 29, as well as the amount of light which is received by the light-sensitive resistor 30. Furthermore, the circuit 21 may be provided with a variable resistor actuated by the diaphragm setting structure to place this variable resistor at a position which is determined by the size of the exposure aperture of the camera, and in this way the factor of the size of the exposure aperture will influence the magnitude of the current flowing through the branch 27 and in addition a second variable resistor may be provided in the circuit 21 to introduce the factor of the speed of the film which is used in the camera. All of these factors will influence the magnitude of the current flowing through the branch 27, and in this way the structure will automatically cause the relay 29 to turn the pawl 31 in opposition to the spring 32 at an instant when the shutter has remained in its open position by the length of time required to give a proper exposure for the available light, the setting of the diaphragm, and the speed of the film which is used in the camera. Of course, instead of variable resistors, it is possible to provide at the window through which the light reaches the light-sensitive resistor 30, slidable cover elements or the like which will cover and uncover the window to an extent which takes into account the factors of the size of the aperture and the speed of the film, so that by varying the amount of the light which can reach the light-sensitive element 30 it is also possible to introduce the factors of size of the exposure aperture and speed of the film.

The structure illustrated in FIG. 1 includes a second operating switch 35 which is located next to the operating switch 24 and which is connected with the latter in a well known way so that the cam 26 will simultaneously close the switches 35 and 24. The switch 35 forms part of a blocking circuit 36 which forms part of a blocking means for blocking the operation of the shutter in the event that the lighting conditions are such that a proper exposure cannot be made. Thus, with the blocking means of the invention it will not be possible to operate the structure in such a way as to produce either an under-exposure or an over-exposure, although as will be apparent from the description below, if desired the structure may be designed to take care of only an over-exposure or only an under-exposure.

The blocking circuit 36 is provided with a source of current 37 and a pair of parallel-connected branches 38 and 39. In the branch 38 there is a light-sensitive resistor 40, while the branch 39 of the blocking circuit includes a relay 41 and a light-sensitive resistor 42, connected in series with the relay 41. The light-sensitive resistors operate in such a way that their resistance increases with diminishing light intensity and decreases with increasing light intensity. The magnitude of the resistors 40 and 42 is such that at relatively low light intensity the resistances 40 and 42 are substantially greater than the resistance 41 while at relatively large light intensity the valve of the resistances 40 and 42 is substantially less than the resistance of the relay 41.

The coil of the relay 41 cooperates with an armature formed by part of a pawl 45 which is supported intermediate its ends for turning movement about a stationary pin carried by the transverse wall of the shutter housing, and a spring 43 acts on the pawl 45 to turn the latter in a counterclockwise direction, as viewed in FIG. 1, away from the coil in the relay 41, and when this relay is energized it will turn the pawl 45 in a clockwise direction as viewed in FIG. 1, in opposition to the spring 43. The trailing shutter ring 2 is provided with a projection 44 which cooperates with the pawl 45. When the relay 41 is unenergized the spring 43 maintains the tip of the pawl 45 against the outer periphery of the ring 2, and thus at this time when the operator turns the shaft 13 and plate 14 in a counterclockwise direction, as viewed in FIG. 1, the pawl 18 will engage the lug 11 to turn the ring 1 and through the lug 12 the ring 2 in a clockwise direction, as viewed in FIG. 1, but as long as the relay 41 is unenergized the projection 44 will engage the pawl 45 and thus the operator will not be able to cock the shutter, and the operator will therefore know that the lighting conditions are not suitable for a proper exposure.

The switches 23, 24, and 35 as well as the relays 29 and 41 are advantageously located within the tubular housing of the objective, while the light-sensitive resistors 30, 40 and 42 are located at the front wall of the tube of the objective or at a front wall of the camera so as to be exposed to the light through suitable windows or openings. The remaining parts of the above-described structure which forms an exposure control and blocking device as described above are located within the camera housing or within the compartment over the camera housing where such *elements* [elemnts] as the view finder are located.

When an exposure is made the exposure controlling circuit 21 will operate in the manner described above to actuate the relay 29 so as to control the exposure time. Assuming, however, that the light intensity is so great that a proper exposure cannot be made, then in this event the resistors 40 and 42 have a value which is extremely low, and these resistances under these lighting conditions are extremely small as compared to the constant resistance of the relay 41. The current in the blocking circuit 36 will therefore flow almost entirely through the branch 38 so that relay 41 will not be energized under these conditions, and the pawl 45 remains in engagement with the outer periphery of the ring 2, so that the projection 44 will engage the pawl 45 and it will not be possible to cock the shutter. In the event that it is desired only to prevent over-exposure, the resistor 42 may be eliminated.

If the light intensity is so small that a proper exposure cannot be made, then the resistors 40 and 42 have a very large value, and in this case almost no current will flow through the blocking circuit 36, so that again the relay 41 will not be energized and the pawl 45 will remain in engagement with the periphery of the ring 2 so as to prevent cocking of the shutter under these circumstances also. In the event that it is desired only to avoid under-exposure, the branch 38 with the light-sensitive resistor 40 may be eliminated.

When the light intensity during an exposure is such that the resistors 40 and 42 have intermediate values so that current can flow through both of the branches 38 and 39 of the blocking circuit, the current will actuate the relay 41 so as to turn the pawl 45 away from the projection 44 in opposition to the spring 43, and under these conditions the shutter can be cocked and an exposure will be made in the manner described above. As was pointed out above, the moment when the relay 29 will be energized to move the pawl 31 away from the projection 33 is determined by the relation between the constant resistance 34 and the instantaneous resistance of element 30 which is determined by the lighting conditions, as well as by the other factors mentioned above, such as the size of the exposure aperture and the speed of the film which is used in the camera.

After the pawl 18 has moved beyond the lug 11 so as to release the ring 1 for movement in direction of the arrow x of FIG. 1, and after the ring 2 has been moved by the spring 8 back to its position shown in FIG. 1, which is to say after completion of an exposure, the shaft 13 and plate 14 are returned by the spring 15 in the direction of the arrow y of FIG. 1 to the rest position where the plate 14 engages to stop 16, and during this turning the pawl 18 will again engage the lug 11, but the pawl 18 will be free to turn at this time in opposition to the spring 19 away from the stop pin 20 because of the pivotal mounting of the pawl 18 on the pin 17 which is carried by the plate 14, and as soon as the pawl 18 again rides off the lug 11 during the turning of the plate 14 in the direction of the arrow y of FIG. 1, the spring 19 will return the pawl 18 to the position indicated in FIG. 1. Of course, during the return of the plate 14 to the position of FIG. 1 by the spring 15, the cam 26 returns to its rest position and the switches 24 and 35 open so as to open the circuits 21 and 36, respectively.

It will be noted that in the embodiment of FIG. 1 the exposure time controlling structure and the blocking structure form a pair of independent assemblies which are so positioned at their switches 24 and 35 that these switches can be actuated by the single cam 26. Otherwise these assemblies are entirely distinct from each other and of course, if desired, only the exposure time controlling structure may be provided in which case only the switch 24 would be operated by the cam 26, or only the blocking structure may be provided, in which case the switch 35 would be actuated by the cam 26. FIG. 2, however, illustrates an embodiment where the shutter means is identical with that of FIG. 1 but where the exposure time controlling assembly and blocking assembly are combined together into a single assembly and where in addition the release of the trailing ring 2 of the shutter means is brought about not by energizing of the relay but rather by deenergizing of a relay.

Thus, referring to FIG. 2 it will be seen that the illustrated circuit includes a source of current 46 connected with a lead 47a which leads into three branches 48, 49 and 50 of the single circuit which acts both to control the exposure time as well as to block operation under unfavorable lighting conditions. The branch 48 of the circuit is connected with one coil of the relay 51. This relay includes a second coil which is connected into an additional circuit 52. This circuit 52 includes the condenser 53 and a light-sensitive resistor 54 connected in series with each other and with the second coil of the relay 51. Furthermore, branch 48 includes in series with the first coil of the relay 51 a *light-sensitive* [light-senstive] resistor 55. The branch 49 of the circuit carries a light-sensitive resistor 56 and the branches 48 and 49 are connected together at the junction 154. The light-sensitive resistors 55 and 56 are thus connected in series and in parallel, respectively, with the relay 51. The light-sensitive resistors 55 and 56 have with respect to the relay 51 the same relation that the resistors 40 and 42 of FIG. 1 have with respect to the relay 41. Thus, at small light intensities the resistances of the resistors 55 and 56 are substantially greater than the resistance of the relay 51, while at large light intensities the resistances of the resistors 55 and 56 is substantially smaller than the constant resistance of the relay 51. The branch 50 of the circuit is provided with a constant resistance 57 as well as with the control switch 58 which corresponds to the control switch 23 of FIG. 1 and which is operated in the same way by the lug 25 which is carried by the leading shutter ring 1 for rotary movement therewith. The branch 50 is connected to the branches 48 and 49 at the junction 154 to which the lead 47b of the control and blocking circuit 47 is connected. The lead 47a of the circuit carries the operating switch 68 which is closed by the cam 26 of the plate 14 in the manner described above in connection with FIG. 1 with respect to the switches 35 and 24.

The lead 47b of the circuit carries a variable resistor 59 which is coupled with the diaphragm adjusting structure so that the size of the resistance 59 at any given instant corresponds to the aperture at which the camera is set, and of course a similar variable resistance may be included for the same purpose in the circuit 21 of FIG. 1 as was mentioned above. The lead 47b carries a second variable resistor formed by the series of resistances 60a–60e of different sizes adapted to be selectively connected into the circuit through the movable contact 61, and when the operator of the camera sets a dial or the like to the exposure index which corresponds to the speed of the film which is used in the camera, the contact arm 61 will be connected to one of the resistors 60a–60e which corresponds to the particular speed of the film used in the camera, and in this way the circuit 47 takes into account the factor of film speed as well as the factor of the size of the aperture. Of course, a variable resistor similar to the variable resistor 60a–60e. 61 may be also used in the circuit 21 of FIG. 1 for the same purpose as was pointed out above. Of course, instead of these variable resistors to introduce the factors of the exposure aperture and the film speed it is possible to provide elements which will cover or uncover the light-sensitive resistors 54, 55, and 56 to an extent which takes into account [of] the factors of exposure aperture and film speed, as has already been pointed out above.

The relay 51 cooperates with a double-acting pawl means formed by a pawl 62 which is supported for turning movement by stationary pivot 64 carried by the transverse wall of the shutter housing, and a spring 63 is connected to the pawl 62 for urging the latter in direction of the arrow z of FIG. 2. The double-acting pawl 62 has a pair of teeth 65 and 66 adapted to cooperate with the ends, respectively, of the projection 67 of the trailing shutter ring 2. Thus, the tooth 65 of the pawl 62 is adapted to cooperate with the end 67b of the projection 67 for retaining the shutter ring 2 in opposition to the spring 8 in the cocked position of the shutter in the same way that the pawl 31 cooperates with the projection 33 to retain the ring 2 of FIG. 1 in its cocked position, as was described above, and the other tooth 66 of the pawl 62 cooperates with the end 67a of the projection 67 to prevent an exposure from being made when the lighting conditions are such that a proper exposure will not result.

The switches 58 and 68 of the structure of FIG. 2 as well as the relay 51 are located in the tubular housing of the objective assembly, while the light-sensitive resistors 54–56 are located behind a window, for example, in an upper part of the camera and the resistances 59 and 60a–60e, the source of current 46, and the [condensor] *condenser* 53 can be located at any suitable parts of the camera housing or the compartment over the camera housing.

The structure is illustrated in FIG. 2 in the rest position of the shutter means and in the position where the circuit 47 is open. In order to make an exposure the shaft 13 is turned in a counterclockwise direction so as to turn the plate 14 in opposition to the direction of the arrow y, in the same way as was pointed out above in connection with FIG. 1. In this way the pawl 18 will engage the lug 11 so as to turn the rings 1 and 2 in opposition to the springs 7 and 8, respectively, as was described above, in order to cock or tension the shutter. Thus, the shutter rings 1 and 2 turn together and because no relative movement exists between these rings the shutter will remain closed while it is being cocked by cooperation of the pawl 18 with the lug 11. During this operation the lug 25 will move away from the switch 58 which will automatically open as the result, for example, of a spring which urges the switch 58 to its open position when it is not held closed by the lug 25. After the switch 58 is opened the cam 26 of the plate 14 will close the operating switch 68 of the circuit.

Assuming that the lighting intensity is satisfactory for a proper exposure, the current will at this time, while the switch 58 remains open, flow along the lead 47a through the branches 48 and 49 and then through the lead 47b. Thus, the current will flow through the coil of the relay 51 which is connected in series with the resistor 55 and will flow through the latter resistor as well as the resistor 56 and the variable resistors 59 and 60a–60e. As a result the relay 51 will become excited and will pull the pawl 62 in opposition to the spring 63 in a direction opposite to the arrow z of the FIG. 2, so that at this time which is to say with proper lighting conditions, the projection 66 of the pawl will be moved beyond the path of turning of the projection 67 of the ring 2, and the shutter can be fully cocked under these conditions. Shortly before reaching the fully cocked position the force of the relay 51 acting on that portion of the pawl 62 which forms an armature which cooperates with the relay turns the tooth 65 of the pawl behind the end 67b of the projection 67, and thus the energized relay itself actuates the pawl to maintain the trailing ring 2 of the shutter in the cocked position, while, as was described when the pawl 18 rides off the lug 11 the spring 7 will return the leading shutter ring 1 to the position shown in FIG. 2, so that the shutter will open in the manner described above in connection with FIG. 1. At the end of the return movement of the leading shutter ring 1 to its position shown in FIG. 2, the lug 25 will close the control switch 58. The current will now flow from the lead 47a through the branch 50 of the circuit, and the current will flow through the closed switch 58 to the junction 154 *and* from the latter through the lead 47b so as to complete the circuit in this manner upon closing of the switch 58. Thus, at this time the relay 51 is short-circuited. Simultaneously the second winding of the relay 51 serves to induce a voltage in the circuit 52. In other words, the closing of the switch 58 of FIG. 2 suddenly short circuits the relay 51 so that the current suddenly stops flowing through the first coil of the relay 51 which is connected in series with the resistor 55, and as a result of this sudden termination of the flow of current through this first coil a voltage is induced in the second coil which forms part of the entire separate circuit 52. As a result the condenser 53 is charged, and the extent to which the condenser 53 is charged is determined by the magnitude of the current flowing in the circuit 47, the magnitude of this current of course being influenced by the settings of the variable resistors 59 and 60a–60e. In this way the factors of exposure aperture size and speed are taken into consideration.

The length of time required for the relay 51 to become unenergized is influenced by the capacitance of the condenser 53 in the circuit 52 as well as by the instantaneous magnitude of the resistance provided by the light-sensitive resistor 54. The time required for de-energizing the relay 51 and thus releasing the pawl 62 to the spring 63 so as to move the tooth 65 away from the projections 67 thus depends upon the charge of the condenser 53 and the intensity of the light received by the light-sensitive resistor 54, and thus the length of time required for the relay 51 to become de-energized increases as the light intensity decreases since at low light intensities the light-sensitive resistor 54 provides a relatively high [resistanve] *resistance* and thus the condenser 53 requires under these conditions a relatively long time to discharge. As soon as the relay 51 becomes unenergized the trailing shutter ring 2 is released in the manner described above so as to close the shutter and terminate the exposure. After return of the ring 2 to the position shown in FIG. 2 and release of the shaft 13 by the operator, all of the parts return to the position indicated in FIG. 2.

Of course, the above-described operation of the embodiment of FIG. 2 takes place when the available light will provide a proper exposure. Assuming that the light intensity is so great that a proper exposure cannot be made, then after the operator turns the shaft 13 so as to open the switch 58 and close the switch 68, the current will flow from the lead 47a only through the branch 49 and from the latter through the lead 47b. The branch 48 remains practically without any current because the resistance of the relay 51 is so much greater than that of the light-sensitive resistor 56 under these conditions of large light intensity. Thus, at this time the relay 51 will not become energized and the spring 63 will retain the [doube-acting] *double-acting* pawl 62 in the position where its tooth 66 is in the path of turning of the projection 67 so that the latter will engage this tooth 66 when the operator tries to cock the shutter. Thus, the shutter rings 1 and 2 will turn through an angle smaller than that required to cock the shutter, the pawl 18 will not be able to ride off the lug 11, and thus it will not be possible to operate the shutter under these conditions and exposure cannot be made.

Assuming that the available light is of such low intensity that a proper exposure cannot be made, then after the switch 58 is opened and the switch 68 is closed during the cocking of the shutter of FIG. 2, the current also will fail to flow through the branch 48 since at this time the resistance of the light-sensitive resistor 55 is substantially greater than the resistance of the relay 51, and under these conditions the tooth 66 of the double-acting [pulse] *pawl* 62 will cooperate with the projection 67 to prevent an exposure from being made. The variable resistor 59 for introducing the factor of the size of the exposure aperture as well as the variable resistor 60a–60e for introducing the factor of film speed are located in the circuit of the relay so that these variable resistors provide different resistances which will determine the limits of the range in which the relay 51 will become energized, and in this way this range is automatically adapted to the preselected values of the exposure aperture and film speed, and thus in this way also the blocking of the actuation of the shutter is adapted to the particular lighting conditions which will provide a proper exposure with the particular film speed and the particular aperture size selected by the user of the camera.

The embodiment of the invention which is illustrated in FIG. 3 is identical with that of FIG. 2 with the exception of the construction of the double-acting pawl means. Thus, instead of a single double-acting pawl 62 as illustrated in FIG. 2, the embodiment of FIG. 3 includes a pair of pawls 69 and 70 which form the double-acting pawl means. The pawl 69 is supported for turning movement by a pivot pin 71 carried by the transverse wall of the shutter housing, and the pawl 70 is supported for turning movement by a similar pivot pin 72. The spring 73 urges the pawl 69 in a clockwise direction, as viewed in FIG. 3, and FIG. 3 illustrates a stop pin engaged by the pawl 69 to limit its turning under the influence of the spring 73. It will be noted that the tooth 75 of the pawl 69 is closely adjacent to the outer periphery of the projection 76 which terminates at its left end, as viewed in FIG. 3, with a shoulder 76a adapted to cooperate with the tooth 75 for retaining the trailing shutter ring 2 in its cocked position. A spring 74 [is] coiled around the pivot pin 72[,] presses with one end against the stationary pin carried by the transverse wall of the shutter housing, and presses with its opposite end against a pin carried by the pawl 70 so as to urge the latter to turn in a counterclockwise direction about the pivot pin 72, as viewed in FIG. 3. Thus, the spring 74 urges the free end 77 of the pawl 70 into the path of turning movement of a projection 78 which is carried by the leading shutter ring 1. Thus, during cocking of the shutter if the end 77 of the pawl 70 is located in the path of turning movement of the projection 78, the operator will not be able to cock the shutter and will know that the lighting conditions are not suitable for a proper exposure. The free ends 69a and 70a of the pawls 69 and 70, respectively, form armatures cooperating with the same [coils] *coil* of the relay 51.

Assuming that the lighting conditions are suitable for a proper exposure, then when the structure of FIG. 3 is operated the switch 58 will open and the switch 68 will close so that current will flow from the lead 47a through the branches 48 and 49 and then back through the [branch] *lead* 47b. The relay 51 will thus be energized and will first turn the pawl 70 in clockwise direction indicated by the arrow w in FIG. 3 so that the free end 77 will be located out of the path of turning of the projection 78 and thus the shutter can be fully cocked and then released. The energized relay 51 cannot immediately [burn] *turn* the pawl 69 in opposition to the spring 73 in a counterclockwise direction, as viewed in FIG. 3, inasmuch as the tooth 75 is at this time aligned with the outer periphery of the projection 76, but just before the shutter is fully cocked, which is to say just before the pawl 18 rides off the lug 11, the force of the relay will turn the pawl 69 [as] *so* as to [located] *locate* the tooth 75 in engagement with the shoulder 76a, and thus, the shutter will remain open for the length of time necessary to make a proper exposure, as described above.

In the event that the light intensity is so great that a proper exposure cannot be made, then after the switch 58 is opened and the switch [60] *68* is closed during cocking of the shutter the current will flow only through the branch 49 since the resistance of the light-sensitive resistor 56 at this time is [so] much less than that of the relay 51, and thus the relay 51 will not become energized so that at this time the free end 77 of the pawl 70 will be located in the path of turning of the projection 78 and will prevent cocking of the shutter. The pawl 18 will not be able to ride off the lug 11, and thus the operator will know that a proper exposure cannot be made.

In the same way, if the light intensity is so low that a proper exposure cannot be made, then the value of the resistance provided by the light-sensitive resistor 55 is so great that in this case also the relay 51 will not become energized and thus the free end 77 of the pawl 70 will again remain in the path of turning of the projections 78 to prevent cocking of the shutter. Under these conditions the resistance provided by the light-sensitive resistor 55 is so much greater than that of the relay 51 that practically no current flows through the branch 48.

In the embodiments of FIGS. 1–3, the blocking means which prevents an exposure from being made acts to prevent cocking of the shutter. In the embodiment of the invention which is illustrated in FIG. 4, the shutter structure itself is substantially the same as that of FIGS. 1–3, but the blocking means operates not to prevent cocking of the shutter, but only to prevent release of the shutter in the event that the lighting conditions are such that a proper exposure cannot be made.

As may be seen from FIG. 4, the shutter means again includes the leading shutter ring 1, the trailing shutter ring 2, the springs 7 and 8 for retaining these rings in the rest position of the shutter means, and it will be noted that the ring 1 is again provided with a projection 9 cooperating with a stop carried by the stationary ring 3 for determining the rest position of the shutter construction. In addition to the projection 9, the leading shutter ring 1 carries a pair of lugs 79 and 80 which extend radially from the ring 1 across the stationary ring 3 and the trailing ring 2, as is apparent from FIG. 4.

The lug 79 fixedly [carries] *carries* a pin 81 which cooperates with a lever 83 fixedly carried by a rotary shaft 82 which is connected in the same way as the shaft 13 referred to above with a suitable knob, handle, or the like, so that the operator can turn the shaft 82 and thus the lever 83 in the direction of the arrow v of FIG. 4 for the purpose of cocking the shutter. A spring 84 cooperates with a lever 83 to urge the latter to the rest position shown in FIG. 4 in engagement with the stop pin 85. The lug 79 is provided with a curved edge portion 79a followed by a notch 86. In the cocked or tensioned position of the shutter means, this notch 86 receives the free end portion 87 of a shutter release lever 88 which is pivotally supported by the stationary pin 89 and which is urged by the spring 90 in a clockwise direction into engagement with the stop pin 91 carried by the transverse wall of the shutter housing. The lug 80 is also provided with a curved edge portion 80a, and a pawl 92 has a tooth which cooperates with the curved edge 80a of the lug 80 of the leading shutter ring 1. This ring 1 also carries the lug 25 which cooperates with the control switch 23 in the manner already described above in connection with FIG. 1.

The trailing shutter ring 2 of FIG. 4 carries again an axial projection 12, and this projection now cooperates with the lug 79, and in the same way as in the embodiment of FIG. 1 the ring 2 has a projection 33 which cooperates with the pawl 31. The exposure time controlling circuit and the blocking circuit are combined together in the embodiment of FIG. 4 and are provided with a single source of current 93. One pole of the battery 93 is connected through the lead 94 with the junction 95 to which the parallel-connected circuit portions 96 and 97 are connected. The other pole *of the battery* 93 is connected by the lead 98 with the junction 100 to which the circuit portions 96 and 97 are also connected. The lead 98 is provided with a manually operable switch 99.

In the circuit portion 96 are located a pair of parallel-connected branches 101 and 102, the branch 101 being provided with the light-sensitive resistor 103 and the branch 102 being provided with the relay 104 as well as the light-sensitive resistor 105 connected in series with the relay 104. A portion of the pawl 92 forms the movable armature of the relay 104. A spring 106 urges the pawl 92 in a counterclockwise direction, as viewed in FIG. 4, so as to urge the pawl 92 away from the coil of the relay 104 and against the edge 80a of the lug 80. When the relay 104 is energized the pawl 92 will be turned in opposition to the spring 106 away from the lug 80 and out of the path of turning movement thereof.

The circuit portion 96 also carries the operating switch 107 which has a movable contact arm urged by an unillustrated spring against the camming portion of the release lever 88 which engages the switch 107 in the manner shown in FIG. 4. When the lever 88 is turned by the operator in the direction of the arrow t, the camming portion of the lever will close the switch 107. The free outer end of the lever 88 extends through a suitable slot in the tubular housing of the shutter so as to be accessible to the operator.

The circuit portion 97 is provided, as was the case with the embodiment of FIG. 1, not only with the control switch 23 but also with the pair of parallel-connected branches 27 and 28, the branch 27 being provided with the relay 29 and the lift-sensitive resistor 30, while the branch 28 is provided with the resistor 34, this structure being identical with that of FIG. 1.

In order to take into account the factors of film speed and aperture size, the lead 98 may be provided with variable resistors such as the variable resistors 59 and 60a–60e described above, or adjustable covers may be provided at the windows or opening through which light reaches the several light-sensistive resistors.

In order to make an exposure the shaft 82 is turned by the operator in the direction of the arrow v. Thus, the lever 83 will engage the pin 81 so as to move the latter and through the lug 79 the ring 1, this ring turning at this time in a clockwise direction, as viewed in FIG. 4. The lug 79 of course engages the lug 12 so as to turn the trailing shutter ring 2 together with the leading shutter ring 1 in a clockwise direction during the cocking of the shutter. The cocking of the shutter terminates when the end 87 of the lever 88 enters into the notch 86, and of course the pawl 92 will at this time engage the lower edge of the lug 80. The control switch 23 is of course open at this time, and also the pawl 31 has engaged the left end of the projection 33.

Just before release of the shutter to make an exposure the switch 99 is closed manually and then the lever 88 is moved by the operator in the direction of the arrow t so as to release the shutter. It is possible to eliminate the switch 99 if desired, in the event that the shutter is to be cocked only just before making an exposure. With the switch 99 it is possible to leave the shutter in a cocked position and then switch 99 can be closed just before an exposure is made. Moreover, it is possible to combine the switch 99 with the switch 107 in the same way as the switches 24 and 35 described above in connection with FIG. 1, and in this way the camming portion of the lever 88 will serve to close both of the switches 99 and 107. Immediately after the start of the turning movement of the release lever for releasing the cocked shutter in order to make an exposure, the camming portion of the lever 88 will close this switch 107. With the closing of the switch 107 the [circuits] *circuit* 98, 94, 96 [,] is closed, while current does not flow at this time through the circuit portion 97 inasmuch as the switch 23 is open.

In the event that the light intensity is such that a proper exposure can be made, then the resistances of the light-sensitive resistors 103 and 105 will be in the range of the resistance of the relay 104, and current will flow through this relay so as to energize it and pull the pawl 92 away from the lug 80 in opposition to the spring 106. During the turning of the release lever 88 by the operator the free end 87 of the lever will move out of the notch 86 so that the leading shutter ring 1 will now be released to the force of the spring 7 to be returned to its starting position, and thus the shutter will be opened, the ring 2 [beign] *being* held at this time by the cooperation of the pawl 31 with the projection 33. Just before the ring 1 reaches the position shown in FIG. 4, which is to say its end position, the lug 25 will close the switch 23 so that now the circuit portion 97 will receive current. After a length of time determined essentially by the size of the resistance provided by the light-sensitive resistor 30, the relay 29 will become energized and will move the pawl 31 away from the projection 33 so that the trailing shutter ring 2 will now be turned by the spring 8 so as to close the shutter.

In the event that the light intensity is too small to provide a proper exposure, then after the switch 107 is closed there will be very little if any current flowing through the branch 102 of the circuit 96, and thus the relay 104 will not be energized. At this time the light-sensitive resistor 105 has a resistance which is quite high and much greater than that of the relay 104. Thus, the pawl 92 will remain in engagement with the lug 80, so that even after the lever 88 has been turned fully the leading ring 1 will not be released to open the shutter and thus an exposure will not be made.

In the event that the light intensity is so great that a proper exposure cannot be made, then when the switch 107 is closed, current wil flow only through the branch 101, practically no current flowing through the branch 102 inasmuch as the value of the resistance of the relay 104 at this time is so much greater than that of the light-sensitive resistors 103 and 105, so that in this event also the relay 104 is not energized and the pawl 92 remains in engagement with the lug 80 so as to prevent release of the shutter, and thus an exposure again will not be made at this time.

The ring 2 fixedly carries a radially projecting indicating member 158 which, as is indicated diagrammatically in FIG. 4, is visible in the viewfinder 157 when the ring 2 is in its rest position, which is to say when the shutter is not cocked. During cocking of the shutter the ring 2 turns in a clockwise direction, as viewed in FIG. 4, so that the indicator 158 is no longer visible to the operator, and thus the operator knows when the indicator 158 is not seen in the viewfinder that the shutter has not been released to make an exposure.

The embodiment of the invention which is illustrated in FIG. 5 includes a type of shutter different from that of FIGS. 1–4 and in the embodiment of FIG. 5 the exposure controlling elements include a galvanometer. The shutter blades 108 of which only one is shown for the sake of clarity are pivotally supported by pins 109 carried on the turnable shutter ring 110 which is supported in a known way for rotary movement. The shutter blades 108 are respectively formed with the slots 111 which receive the stationary pins 112 fixedly carried by the transverse wall of the shutter housing. The ring 110 is connected by a connecting rod 114 with a main drive element 115 which is supported for rotation about its axis and which is driven by an unillustrated spring in a known way. The drive means 115 rotates in the direction of the arrow s through one revolution for the purpose of first opening and then closing the shutter. The ring 110 will during the turning of the element 115 through a revolution turn first in one direction to open the shutter and then in the opposite direction to close the shutter.

In order to provide different exposure times and in order to control the exposure time there is provided a retarding mechanism including a train of gears 116. The gear 118 meshes with a pinion of a gear train 116, while the last gear of the train 116 cooperates with an escapement 117 in a known way. A spring 119 cooperates with the gear 118 to urge the latter in a clockwise direction, and the turning of the gear 118 by the spring 119 will serve to move a projection 120 carried by the gear 118 into the path of turning movement of a projection 121 which is carried by the rotary drive element 115. This drive element 115 is also provided with a stop shoulder 115a. This shoulder engages the free end 122 of a shutter release lever 123.

The exposure controlling assembly includes the galvanometer 124 which is electrically connected with a photocell 125 located at the front side of the camera, and this galvanometer includes a rotary pointer 126. The angular position of the pointer 126 is scanned by the steps 127 of a plate 129 which is supported for turning movement by a stationary pivot pin 128 carried by any stationary part of the camera. This plate 129 which is provided with the steps 127 is also provided distant from these steps with an elongated arm 130 at whose free end a pin 131 which is fixed to the gear 118 bears, and it will be seen that the spring 119 urges the pin 131 of the gear 118 against the arm 130 of the plate 129. Moreover a spring 132 is connected to the plate 129 to urge the latter to turn in a counterclockwise direction about the pivot 128, as viewed in FIG. 5, so that the spring 132 urges the teeth or steps 127 toward the pointer 126. Also, the plate 129 is formed with a cutout 133 defined in part by an edge 133a, and a pin 134 which is carried by a lever 135 engages this edge 133a which defines part of the cutout 133. This pin 134 is located at the right free end, as viewed in FIG. 5, of the lever 135 which is fixed to the pin 136 for rotary movement with the latter. This pin 136 is supported by any suitable bearing for rotary movement and an extension of the pin 136 is connected to any suitable handle or the like accessible to the operator who can turn the pin 136 so as to also turn lever 135. The left free end of the lever 135 fixedly carries a pin 137 which cooperates with an arm 138 of the release lever 123. The lever 135 is shown in FIG. 5 in its rest position, and it is releasably maintained in this rest position by the spring 139 which urges the lever 135 to turn in a clockwise direction, as viewed in FIG. 5. The force of the spring 139 is greater than the sum of the forces of the springs 132 and 119. In order to release the exposure controlling device and the shutter the shaft 136 is manually turned by the unillustrated handle or the like referred to above.

The structure of FIG. 5 for preventing an improper exposure includes the source of current 140 located in the circuit 141. This circuit 141 includes a pair of parallel-connected branches 142 and 143. The branch 142 is provided with a relay 144 as well as with a light-sensitive resistor 145 connected in series with the relay 144, while the branch 143 is provided with the light-sensitive resistor 146. In the blocking circuit 141 are located, in series with the source of current 140, a pair of variable resistors 155 and 156 one of which is connected with the diaphragm adjusting structure and the other of which is connected with a device which indicates the film speed, so that the variable resistors 155 and 156 will introduce the factors of the size of the exposure aperture and the speed of the film which is used in the camera.

The armature of the relay 144 is formed by a blocking member 149 which is supported for turning movement by a stationary pin 150 carried by the transverse wall of the shutter housing, and a spring 151 is connected to the blocking member 149 to urge the latter to turn in a counterclockwise direction, as viewed in FIG. 5, into engagement with the stationary stop pin 152. In this position of the blocking member 149, where it is maintained by the spring 151 away from the coil 144, this blocking element 149 is located in the path of turning movement of the free end 153 of the release lever 123. The circuit 141 also includes an operating switch 147 which is closed by the camming portion 148 of the shutter release lever 123 when the latter turns upon release of the shutter.

In order to take into account the factors of film speed and also of the size of the exposure aperture, it is also possible to use adjustable covering elements over the light-sensitive resistors 145, 146 and the photocell 125, instead of the variable resistors 155 and 156.

In order to make an exposure with the above-described structure of FIG. 5, the shaft 136 is manually turned in the direction of the arrow r. As a result the lever 135 turns in the same direction and the spring 132 can turn the plate 129 in a counterclockwise direction, as viewed in FIG. 5, about the pin 128. Thus, the steps or teeth 127 will move into the engagement with the pointer 126 whose angular position at any given instant reflects the intensity of the available light, as is well known. Thus, the cooperation of the steps or teeth 127 of the plate 129 with the pointer 126 will provide the plate 129 with an angular position determined by the light-intensity. The arm 130 will of course turn with the plate 129 and will thus enable the spring 119 to turn the gear 118 and its projection 120 through an angle determined by the intensity of the available light.

When the light intensity is relatively great, the teeth 127 will move through only a relatively short distance before engaging the pointer 126, so that as a result the gear 118 will be turned by the spring 119 through only a small angle and under these conditions the projection 120 will not even be located in the path of movement of the projection 121 of the driving element 115. As the light intensity becomes smaller the angle through which the plate 129 turns before the steps 127 engage the pointer 126 becomes greater, and thus the arm 130 as well as the gears 118 turn through greater angles. Therefore, the projection 120 moves into the path of turning of the projection 121 to an increasing extent as the light intensity diminishes. Inasmuch as the projection 121 of the main driving element 115 strikes against the projection 120 during the rotary movement of the element 115, the element [121] *115* will turn the projection 120 and the gear 118 so as to set into motion the gear train 116 and the escapement 117, and in this way the structure 116–118 will serve to retard the rotary movement of the driving element 115 and will thus determine the exposure time. Thus, the angle through which the plate 129 can turn is determined by the light which reaches the photocell 125 and which turns the point 126 of the galvanometer 124 and this angle through which the plate 129 can turn will determine the extent to which the rotary movement of the main driving element 115 is retarded so that in this way the exposure time is determined in accordance with the intensity of the light sensed by the photocell 125. The element 115 during its rotation in the direction of the arrow s of FIG. 5 not only opens and closes the shutter but also turns the gear 118 in opposition to the spring 119, so that in this way the retarding mechanism cooperates with the element 115 to control the exposure time.

When the operator turns the lever 135 in the direction of the arrow r of FIG. 5, the shutter release lever 123 is turned in the direction of the arrow p, as the result of the action of the pin 137 of the arm 138. Immediately after the release lever 123 starts to turn the camming projection 148 thereof closes the operating switch 147 of the blocking circuit 141. When the light intensity is such that a proper exposure can be made, current will flow through the branches 142, 143 and the relay 144 will become energized so as to pull the blocking element 149 away from the stop pin 152 in opposition to the spring 151 and thus the blocking element 149 is located out of the path of the turning of the free end 153 of the release lever 123. Thus, the blocking element 149 will not prevent turning of the lever 123 beyond the point at which the end 153 of lever 123 would engage element 149 if it were in its blocking position, so that under these conditions the release lever 123 can be turned through an angle sufficient to locate the end 122 of the lever 123 radially beyond the shoulder 115a of element 115, and the latter is thus released to the force of its driving spring for opening and closing the shutter.

If the light intensity is so small that a proper exposure cannot be made, then upon closing of the switch 147 there will be a very small amount of current flowing through the circuit 141 and in particular in the branch 142 inasmuch as the light-sensitive resistors 145 and 146 at this time provide a very great resistance. Thus, the relay 144 will not become energized and the free end 153 of the lever 123 will engage the blocking element 149 before the other end 122 of the lever 123 moves beyond the shoulder 115a, and thus the driving element 115 is not released and an exposure is not made.

In the same way, when the operator starts to make an exposure under conditions where the light intensity is too great for a proper exposure, the resistance of the light-sensitive resistor 146 is so small that compared to that of the relay 144 [that] practically not any current flows through the branch 142 and all the current flows through the branch 143, so that in this case also the relay 144 is not energized and the blocking element 149 remains in its blocking position in the path of turning movement of the end 153 of the lever 123, so that in this case also the driving element 115 is not released and an exposure cannot be made.

The above-described invention is of course not limited to the details of the particular embodiments disclosed. Any types of exposure controlling devices may be used and it is of course immaterial whether the exposure controlling device controls a between-the-lens shutter as shown in the instant application or a focal plane type of shutter. Also, it is possible to provide only a prevention of over-exposures or only a prevention of under-exposures if desired.

It will be understood that each of the elements described above or two or more together, may also find a useful application in other types of cameras differing from the types described above.

While the invention has been illustrated and described as embodied in exposure controls for cameras, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention [and, therefore, such adaptations should and are intended to be comprehended within the meaning and range of equivalence of the following claims].

What is claimed and desired to be secured by Letters Patent is:

[1. In a camera, in combination, shutter means having a closed position preventing an exposure and an open position providing exposure; releasable holding means cooperating with said shutter means for releasably holding the same in said open position thereof said releasable holding means including an actuating solenoid; and light-sensitive resistance means cooperating with said actuating solenoid of said releasable holding means for actuating the same to release said shutter means for movement from said open to said closed position thereof according to the light sensed by said light-sensitive resistance means.]

[2. In a camera, in combination, shutter means having leading and trailing rotary shutter rings; pawl means cooperating with said trailing ring of said shutter means for holding said shutter means in a tensioned position preparatory to make an exposure, said leading shutter ring turning with respect to said trailing shutter ring upon release of said shutter means for making an exposure; and light-sensitive relay means cooperating with said pawl means to control the operation thereof for releasing said trailing shutter ring to follow said leading shutter ring for closing said shutter means according to the length of time determined by the light sensed by said light-sensitive relay means.]

[3. In a camera as recited in claim 2, said trailing ring having a projection; spring means cooperating with said pawl means for urging the latter to a position cooperating with said projection to prevent movement of said trailing ring; and said light-sensitive relay means having a relay armature formed by part of said pawl means and a relay coil cooperating with said armature for turning said pawl means in opposition to said spring means to release said trailing shutter ring when said relay means is energized, said relay means including a light-sensitive element controlling the excitation of said relay means to move said pawl means in opposition to said spring means in accordance with the light sensed by said light-sensitive element of said relay means.]

[4. In a camera as recited in claim 3, said light-sensitive element being a resistor connected in series with said relay coil.]

[5. In a camera, in combination, shutter means having leading and trailing rotary shutter rings; pawl means cooperating with said trailing ring of said shutter means for holding said shutter means in a tensioned position preparatory to making an exposure, said leading shutter ring turning with respect to said trailing shutter ring upon release of said shutter means for making an exposure; light-sensitive relay means cooperating with said pawl means to control the operation thereof for releasing said trailing shutter ring to follow said leading shutter ring for closing said shutter means according to the length of time determined by the light sensed by said light-sensitive relay means; an electrical circuit in which said relay means is located, said circuit including a control switch; and a switch-operating member carried by said leading ring for rotary movement therewith and closing said control switch upon movement of said leading ring with respect to said trailing ring to a position opening said shutter means.]

6. In a camera, in combination, shutter means having an open position for making an exposure and a closed position for preventing an exposure, said shutter means including leading and trailing rotary shutter rings and said shutter means having a rest position and a tensioned position; pawl means cooperating with said trailing ring of said shutter means for holding the latter in said tensioned position thereof; shutter operating means cooperating with said shutter means for moving the same from said rest to said tensioned position thereof and for then releasing said leading shutter ring for movement with respect to said trailing shutter ring to a position placing said shutter means in said open position[.] thereof; light-sensitive relay means cooperating with said pawl means for controlling the operation thereof to release said trailing shutter ring to follow said leading shutter ring and close said shutter means and place the same in said rest position thereof in accordance with the light sensed by said light-sensitive relay means; an electrical circuit in which said light-sensitive relay means is located, said circuit including a control switch and an operating switch; a first switch operating member connected with said shutter operating means for movement therewith and cooperating with said operating switch for closing the same upon actuation of said shutter operating means to move said shutter means from said rest to said tensioned position thereof; and a second switch-operating member carried by said leading shutter ring for movement therewith and engaging and closing said control switch of said circuit when said leading shutter ring is released by said shutter operating means for turning movement with respect to said trailing shutter ring to place said shutter means in said open position thereof.

[7. In a camera, in combination, shutter means having opened and closed positions and including a leading ring and a trailing ring, said leading ring being angularly displaced with respect to said trailing ring for placing said shutter means in said open position thereof and said trailing ring having a projection; pawl means cooperating with said projection of said trailing ring for preventing the latter from following said leading ring so as to maintain said shutter means in said open position thereof until said pawl releases said projection to release said trailing ring for following said leading ring; spring means cooperating with said pawl for urging the latter to a position releasing said projection and said trailing ring; and light-sensitive relay means cooperating with said pawl for maintaining the latter in opposition to said spring means in engagement with said projection of said trailing ring until said relay means becomes unenergized in accordance with the light sensed by said relay means.]

8. In a camera, in combination, shutter means having opened and closed positions and including a leading ring and a trailing ring, said leading ring being angularly displaced with respect to said trailing ring for placing said shutter means in said open position thereof and said trailing ring having a projection; pawl means cooperating with said projection of said trailing ring for preventing the latter from following said leading ring so as to maintain said shutter means in said open position thereof until said pawl *means* releases said projection to release said trailing ring for following said leading ring; spring means cooperating with said pawl *means* for urging the latter to a position releasing said projection and said trailing ring; and light-sensitive relay means cooperating with said pawl *means* for maintaining the latter in opposition to said spring means in engagement with said projection of said trailing ring until said relay means becomes unenergized in accordance with the light sensed by said relay means, said relay means including a portion of the pawl *means* which forms an armature of the relay means and a pair of coils one of which is located in a first circuit and the other of which is located in a circuit which includes a condenser and a light-sensitive resistor.

[9. In a camera, in combination, shutter means having an open position for making an exposure and a closed position for preventing an exposure; releasable holding means cooperating with said shutter means for releasably holding the same in said open position thereof; light-sensitive means cooperating with said releasable holding means for controlling the operation thereof so as to maintain the shutter means in its open position in accordance with the light sensed by said light-sensitive relay means; and a variable resistor connected with said light-sensitive relay means in series for influencing the operation thereof in accordance with a factor other than exposure time to be considered in determining a proper exposure.]

[10. In a camera, in combination, shutter means having an open position for making an exposure and a closed position for preventing an exposure; releasable holding means cooperating with said shutter means for releasably holding the same in said open position thereof; light-sensitive relay means cooperating with said releasable holding means for controlling the operation thereof so as to maintain the shutter means in its open position in accordance with the light sensed by said light-sensitive relay means; and a variable resistor connected in series with said light-sensitive relay means and having a value corresponding to the size of the aperture of the camera so as to influence the operation of the light-sensitive relay means in accordance with the size of the exposure aperture of the camera.]

[11. In a camera, in combination, shutter means having an open position for making an exposure and a closed position for preventing an exposure; releasable holding means cooperating with said shutter means for releasably holding the same in said open position thereof; light-sensitive relay means cooperating with said releasable holding means for controlling the operation thereof so as to maintain the shutter means in its open position in accordance with the light sensed by said light-sensitive relay means; and variable resistor means connected in series with said light-sensitive relay means for being set according to the speed of the film used in the camera and for influencing the operation of said light-sensitive relay means in accordance with the speed of the film used in the camera.]

12. In a camera, in combination, shutter means having an open position for making an exposure and a closed position for preventing an exposure; and light-sensitive blocking means cooperating with said shutter means for automatically preventing movement of the latter from said closed to said open position thereof when the lighting conditions sensed by said light-sensitive blocking means indicate that a proper exposure will not be made, said light-sensitive blocking means including an electrical circuit having its own source of current, a blocking element having an armature portion and cooperating with said shutter means for preventing movement of the latter from said closed to said open position, electromagnetic relay means included in said circuit and cooperating with said armature portion of said blocking element for controlling the operation thereof, and a light-sensitive resistor connected electrically with said relay means.

13. In a camera as recited in claim 12, said shutter means being movable between a rest position and a cocked position, said blocking means cooperating with said shutter means for preventing movement of the latter from said cocked to said rest position thereof, said relay means cooperating with said blocking means for moving the latter to a non-blocking position releasing said shutter means for movement from said cocked to said rest position [thereof] *thereof* when the light sensed by said resistor is suitable for making a proper exposure.

14. In a camera as recited in claim 12, drive means cooperating with said shutter means for driving the same from [a] *said* closed position to [an] *said* open position and then back to said closed position thereof; release means cooperating with said drive means for releasing the latter to drive said shutter means, said blocking means coacting with said release means for blocking the operation of the latter so as to prevent the release of said drive means when said blocking means is in a blocking position thereof.

15. In a camera as recited in claim 12, manually operable shutter release means having a portion movable along a predetermined path when said release means is actuated to release [the] *said* shutter [of the camera] *means*, said blocking element being located in the path of movement of said portion of said manually operable release means to prevent actuation of the latter.

16. In a camera, in combination, support means; a relay armature pivotally carried by said support means and having a blocking position where said armature is adapted to block the operation of a shutter of the camera and a non-blocking position where said armature does not block the operation of the shutter of the camera; a stationary, electromagnetic relay coil cooperating with said armature for controlling the position which the latter takes in accordance with the energizing and de-energizing of said relay coil; and light-sensitive means connected electrically with said coil for controlling the energizing and de-energizing thereof in accordance with the lighting conditions, said coil and resistor means cooperating to maintain said armature in said blocking position thereof when the lighting conditions are at an extreme at which a proper exposure cannot be made.

17. In a camera, in combination, support means; a relay armature pivotally carried by said support means and having a blocking position where said armature is adapted to block the operation of a shutter of the camera and a non-blocking position where said armature does not block the operation of the shutter of the camera; a stationary, electromagnetic relay coil cooperating with said armature for controlling the position which the latter takes in accordance with the energizing and de-energizing of said relay coil; and light-sensitive resistor means connected electrically with said coil for controlling the energizing and de-energizing thereof in accordance with the lighting conditions, said coil and resistor means cooperating to maintain said armature in said blocking position thereof when the lighting conditions are at an extreme at which a proper exposure cannot be made, said resistor means including a resistor connected in series with said coil and having a resistance substantially greater than that of said coil when the available light is insufficient to make a proper exposure.

18. In a camera, in combination, a relay armature having a [blocked] *blocking* position where said armature is adapted to block the operation of a shutter of the camera and a non-blocking position where said armature does not block the operation of the shutter of the camera; a relay coil cooperating with said armature for controlling the position which the later takes in accordance with the energizing and de-energizing of said relay coil; and light-sensitive resistor means connected with said coil for controlling the energizing and de-energizing thereof in accordance with the lighting conditions, said coil and resistor means cooperating to maintain said armature in said blocking position thereof when the lighting conditions are at an extreme at which a proper exposure cannot be made, said resistor means including a resistor connected in parallel with said coil and having a resistance substantially less than that of said coil when the available light is too great for making a proper exposure.

19. In a camera, in combination, shutter means movable between a rest position and a cocked position; blocking means cooperating with said shutter means for preventing movement thereof from said rest to said cocked position when said blocking means is in a blocking position thereof, said blocking means being movable from said blocking to a non-blocking position releasing said shutter means for movement from said rest to said cocked position thereof; actuating solenoid means; and light-sensitive resistance means cooperating with said actuating solenoid means for moving said blocking means to said non-blocking position thereof when the light sensed by said light-sensitive resistance means is satisfactory for making a proper exposure.

20. In a camera, in combination, shutter means; pawl means cooperating with said shutter means for releasably preventing operation thereof; and light-sensitive relay means including a photosensitive resistor, a stationary electromagnet and an armature acted on by said electromagnet and formed by part of a pawl of said pawl means for moving said pawl means to a position releasing said shutter means for operation when the light sensed by said resistor of said light-sensitive relay means is suitable for making a proper exposure.

21. In a camera, in combination, shutter means[,] including a rotary shutter ring having a projection; a pawl cooperating with said projection for preventing operation of said shutter means, said pawl being movable away from said projection to release said shutter means for operation; and light-sensitive relay means including an armature formed by part of said pawl and cooperating with the latter for moving the same away from said projection when the light sensed by said light-sensitive relay means is suitable for making a proper exposure.

22. In a camera, in combination, shutter means having an open position when an exposure is made; blocking means cooperating with said shutter means for preventing movement thereof to said open position when said blocking means is in a blocking position thereof, said blocking means being movable to a non-blocking position; light-sensitive relay means cooperating with said blocking means for moving the same to said non-blocking position when the light sensed by said light-sensitive relay means is suitable for making a proper exposure; an electrical circuit including said relay means and having a switch which must be closed for operation of said relay means; and manually operable shutter actuating means cooperating with said switch for closing the same when said manually operable actuating means is operated by the operator to actuate the shutter means.

23. In a camera, in combination, shutter means; single actuating means for said shutter means; first electrical means cooperating with said single actuating means for said shutter means to prevent operation thereof when the available light is not *suitable* [sutiable] for a proper exposure; second electrical means cooperating with said single actuating means for said shutter means for maintaining the latter in an open position for a length of time determined by the lighting conditions; and current supply means supplying both of said electrical means with current.

24. In a camera, in combination, shutter means; actuating means for said shutter means including actuating solenoid means; and a single light-sensitive resistance means cooperating with said solenoid means of said actuating means for preventing operation of said shutter means when the light sensed by said single resistance means will not provide a proper exposure and for maintaining the shutter means in an open position providing an exposure time according to the light sensed by said single resistance means.

25. In a camera, in combination, shutter means; and a single light-sensitive relay means cooperating with said shutter means for preventing operation thereof when the light sensed by said single relay means will not provide a proper exposure and for maintaining the shutter means in an open position providing an exposure time according to the light sensed by said single relay means, said single light-sensitive relay means including a single pawl part of which forms an armature of the relay means.

26. In a camera, in combination, shutter means; and a single light-sensitive relay means cooperating with said shutter means for preventing operation thereof when the light sensed by said single relay means will not provide a proper exposure and for maintaining the shutter means in an open position providing an exposure time according to the light sensed by said single relay means, said single light-sensitive relay means including a pair of pawls respectively having a pair of portions forming a pair of armatures and said relay means including a single coil cooperating with both of said armatures.

27. In a camera, in combination, shutter means having open and closed positions and including a leading shutter ring and a trailing shutter ring; double-acting pawl means cooperating with said trailing ring for blocking movement of the latter to prevent cocking of the shutter means in one position of said double-acting pawl means and for preventing movement of said trailing ring to maintain said shutter in open position; a single relay means having an armature formed by part of said pawl means and including a pair of coils one of which is in a closed circuit with a condenser and a light-sensitive resistor, the other of said coils being located in a circuit having a pair of switches; a first switch closing member connected to said leading ring for turning movement therewith and closing one of said switches when said leading ring moves with respect to said trailing ring to a position opening said shutter means; and shutter actuating means acting on said shutter means to cock the same and cooperating with the other of said switches for closing the latter and short-circuiting said other coil, the length of time required for said relay to become de-energized being determined by the length of time required for said condenser to discharge; and spring means acting on said double-acting pawl means for moving the latter to a position releasing said trailing ring for movement after said leading ring to close said shutter means when said relay means is de-energized.

28. In a camera, in combination, shutter means having open and closed positions and including a leading shutter ring and a trailing shutter ring; double-acting pawl means cooperating with said trailing ring for blocking movement of the latter to prevent cocking of the shutter means in one position of said double-acting pawl means and for preventing movement of said trailing ring to maintain said shutter in open position; a single relay means having an armature formed by part of said pawl means and including a pair of coils one of which is in a closed circuit with a condenser and a light-sensitive resistor, the other of said coils being located in a circuit having a pair of switches; a first switch closing member connected to said leading ring for turning movement therewith and closing one of said switches when said leading ring moves with respect to said trailing ring to a position opening said shutter means; shutter actuating means acting on said shutter means to cock the same and cooperating with the other of said switches for closing the latter and short-circuiting said other coil, the length of time required for said relay to become de-energized being determined by the length of time required for said condenser to discharge; and spring means acting on said double-acting pawl means for moving the latter to a position releasing said trailing ring for movement after said leading ring to close said shutter means when said relay means is de-energized, said double-acting pawl means being in the form of a pair of pawls and said spring means being in the form of a pair of springs respectively cooperating with said pawls.

29. In a camera, in combination, shutter means movable between closed and open positions; actuating means for moving said shutter means between closed and open positions, said actuating means including solenoid means; light-sensitive resistance means cooperating with said solenoid means for automatically maintaining said shutter means in its open position for a length of time corresponding to the lighting conditions so as to make a proper exposure; and blocking means cooperating with said shutter means for preventing movement thereof to said open position thereof when the lighting conditions are such that a proper exposure cannot be made.

30. In a camera as recited in claim 29, said blocking means being constituted by a first light-sensitive relay means for blocking the movement of said shutter means to said open position when the light sensed by said first relay means is not suitable for making a proper exposure, a first electrical circuit including said first relay means and including a first operating switch which must be closed for operating of said first relay means, said light-sensitive control means being constituted by a second light-sensitive relay means cooperating with said shutter means for maintaining the latter in said open position thereof for a length of time determined by the light sensed by said second light-sensitive relay means, a second circuit including said second relay means and having an operating switch which must be closed for operation of said second relay means, said first and second operating switches being located closely adjacent to each other; and manually operable shutter actuating means cooperating with said shutter means for actuating the same and cooperating with both of said control switches for simultaneously closing the same.

31. In a camera as recited in claim 29, said blocking means being constituted by a first light-sensitive relay means cooperating with said shutter means for preventing operation thereof when lighting conditions are not suitable for proper exposure, said light-sensitive control means being constituted by a second light-sensitive relay means cooperating with said shutter means for controlling the exposure time thereof, and an electrical circuit having a pair of parallel-connected branches in which said first and second relay means are respectively located.

32. In a camera as recited in claim 29, said blocking means being constituted by a first light-sensitive relay means cooperating with said shutter means for preventing movement thereof to an open position when the light sensed by said first light-sensitive relay means is not suitable for a proper exposure, said light-sensitive control means being constituted by a second light-sensitive relay means cooperating with said shuter means for maintaining the latter in an open position in accordance with the light sensed by said second light-sensitive relay means; an electrical circuit common to said first and second light-sensitive relay means; and means forming part of said circuit for regulating the current flowing therethrough according to the speed of the film used in the camera and according to the size of the exposure aperture of the camera.

*33. In a camera, in combination, shutter means including a plurality of shutter blades, a leading ring and a trailing ring, said rings being operatively connected with said shutter blades for opening and closing the latter, said leading ring being angularly displaced with respect to said trailing ring for opening said shutter blades and said trailing ring having a projection; pawl means cooperating with said projection for preventing said trailing ring from following said leading ring so as to maintain said shutter blades in open position until said pawl means releases said projection to release said trailing ring for following said leading ring; spring means cooperating with said pawl means for urging the latter to a position releasing said projection and said trailing ring; and light-sensitive relay means cooperating with said pawl means for maintaining the latter in opposition to said spring means in engagement with said projection of said trailing ring until said relay means becomes unenergized in accordance with the light sensed by said relay means, said relay means including a portion of said pawl means which forms an armature of the relay means and a pair of coils one of which is located in a first circuit and the other of which is located in a circuit which includes a condenser and a light-sensitive resistor.*

*34. In a camera, in combination, shutter means; pawl means cooperating with said shutter means for releasably preventing operation thereof; and light-sensitive relay means including a photosensitive resistor, a stationary electromagnet and an armature acted on by said electromagnet and formed by part of a pawl of said pawl means for moving said pawl means to a position releasing said shutter means for operation when the light sensed by said resistor of said light-sensitive relay means is suitable for making a proper exposure and for blocking said shutter means when the light sensed by said light-sensitive relay means is not suitable for making a proper exposure.*

*35. In a camera, in combination, shutter means including a rotary shutter ring having a projection; a pawl cooperating with said projection for preventing operation of said shutter means, said pawl being movable away from said projection to release said shutter means for operation; and light-sensitive relay means including an armature formed by part of said pawl and cooperating with the latter for moving the same away from said projection when the light sensed by said light-sensitive relay means is suitable for making a proper exposure and for blocking said shutter means when the light sensed by said light-sensitive relay means is not suitable for making a proper exposure.*

*36. In a camera, in combination, shutter means having a plurality of shutter blades and leading and trailing rotary shutter rings operatively connected to said shutter blades for opening and closing the latter; pawl means cooperat with said trailing ring of said shutter means for holding said shutter means in tensioned position preparatory to making an exposure, said leading shutter ring turning with respect to said trailing shutter ring upon release of said shutter means for making an exposure; light-sensitive relay means cooperating with said pawl means to control the operation thereof for releasing said trailing shutter ring to follow said leading shutter ring for closing said shutter blades according to the length of time determined by the light sensed by said light-sensitive relay means; and manually operated means for initiating the turning of said leading shutter ring with respect to said trailing shutter ring.*

References Cited

The following references, cited by the Examiner, are of record in the patented file of this patent or the original patent.

UNITED STATES PATENTS

| | | | |
|---|---|---|---|
| 2,935,921 | 5/1960 | Rentschler | 95—10 |
| 2,978,970 | 4/1961 | Fahlenberg | 95—10 |
| 3,043,203 | 7/1962 | Buhrle | 95—10 |
| 2,061,909 | 11/1936 | Karg | 95—64 |
| 2,179,717 | 11/1939 | Fedotoff | 95—60 |
| 2,179,718 | 11/1939 | Fedotoff | 95—60 |
| 2,325,463 | 7/1943 | Axler | 95—10 |
| 2,913,969 | 11/1959 | Faulhaber | 95—10 |
| 2,935,921 | 5/1960 | Rentschler | 95—10 |
| 2,999,439 | 9/1961 | Nerwin | 95—10 |

FOREIGN PATENTS

| | | |
|---|---|---|
| 1,182,957 | 1/1959 | France. |
| 830,755 | 3/1960 | Great Britain. |

NORTON ANSHER, Primary Examiner

J. F. PETERS, Jr., Assistant Examiner

U.S. Cl. X.R.

95—63